United States Patent [19]

Phillips et al.

[11] 4,224,525
[45] Sep. 23, 1980

[54] APPARATUS FOR PRODUCING STEREO-REGULAR POLYMERS

[75] Inventors: David C. Phillips; Max Garbuny, both of Pittsburgh, Pa.

[73] Assignee: Westinghouse Electric Corp., Pittsburgh, Pa.

[21] Appl. No.: 958,235

[22] Filed: Nov. 6, 1978

Related U.S. Application Data

[62] Division of Ser. No. 599,495, Jul. 28, 1975.

[51] Int. Cl.² ............................................. B01K 1/00
[52] U.S. Cl. .............................. 250/531; 204/159.22;
204/155; 204/165; 204/168; 204/170;
204/DIG. 11; 250/527; 250/528
[58] Field of Search ................... 204/159.22, 155, 165,
204/168, 170, DIG. 11; 427/53, 45, 248 H;
250/527, 531, 528

[56] References Cited

U.S. PATENT DOCUMENTS

| | | | |
|---|---|---|---|
| 3,321,391 | 5/1967 | Warfield et al. | 250/531 |
| 3,405,045 | 10/1968 | Hoskins | 204/159.17 |
| 3,421,930 | 1/1969 | Knox et al. | 204/170 |
| 3,431,137 | 3/1969 | Fadner | 204/170 |
| 3,440,084 | 4/1969 | Turner | 204/159.22 |
| 3,477,932 | 11/1969 | Parts et al. | 204/159.23 |
| 3,719,454 | 3/1973 | Shang | 250/527 |
| 4,012,301 | 3/1977 | Rich et al. | 250/527 |

OTHER PUBLICATIONS

Vlasov et al., "Radiation polmerization from the gas phase . . ." Chem. Abs. 70:88309m 1969.

Bukin et al., "Photopolymerization by laser beam irradiation" Chem. Abs. 67:117483j 1967.

Primary Examiner—Deborah L. Kyle
Attorney, Agent, or Firm—R. D. Fuerle

[57] ABSTRACT

Stereo-regular polymers are produced by forming a moving stream of gaseous monomer having an electric dipole moment, irradiating the monomer with monochromatic light of a wavelength suitable for activating it, and orientating the activated monomer in an electric field. The activated, oriented monomer then polymerizes to form a stereo-regular polymer.

Alternatively, a monomer of the general formula

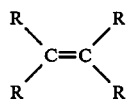

can be used, where at least one of the R groups, the resonating R group, forms an electric dipole moment with the remainder of the monomer. The monomer is then irradiated with a monochromatic light beam having a frequency which resonates with a harmonic frequency resulting from the bond between the resonating R group and the remainder of the monomer. Activation of that particular bond on that particular type of monomer results in a stereo-regular polymer.

For best results, however, the two methods are combined.

12 Claims, 1 Drawing Figure

U.S. Patent
Sep. 23, 1980
4,224,525
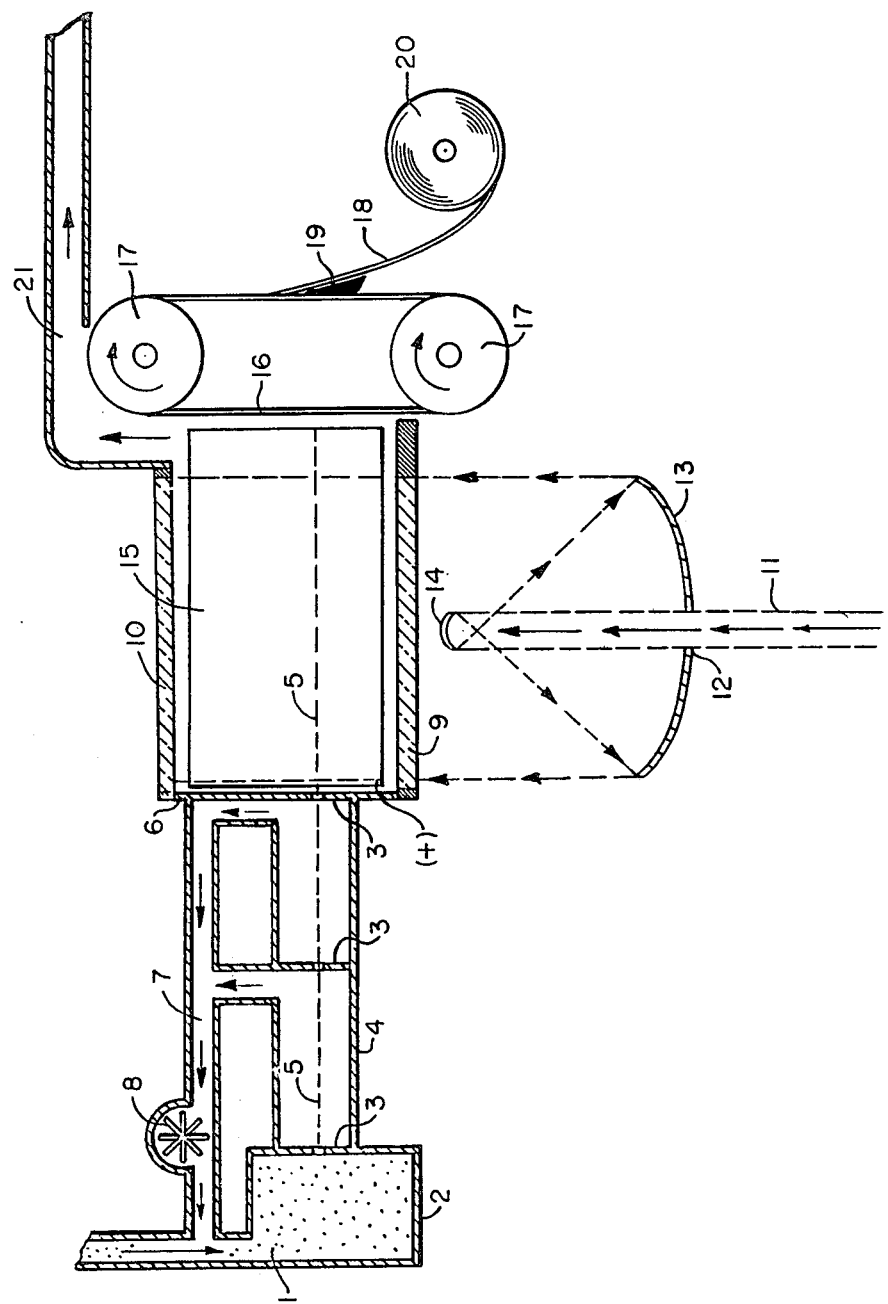

APPARATUS FOR PRODUCING STEREO-REGULAR POLYMERS

CROSS-REFERENCE TO RELATED APPLICATION

This is a division of application Ser. No. 599,495, filed July 28, 1975.

This application is related to application Ser. No. 599,494, filed of even date by Max Garbuny, titled "Gas Dynamic Reaction System For Laser Chemistry."

BACKGROUND OF THE INVENTION

Stereo-regular polymers are polymers whose individual chains are all aligned in the same way. Generally, this means that pendant groups on each chain lie on the same side of the chain (isotactic). For example, in stereo-regular polyvinyl chloride the chlorine atoms are all on the same side of the chain:

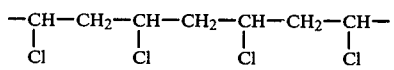

instead of being randomly (atactic) or alternatively (syndiotactic) orientated. In addition, due to this regularity, as the polymer chains are deposited one upon the other, each chain will be orientated in the same manner as its neighbors so that the polymer forms a crystalline structure.

As one might expect, stereo-regular polymers possess many properties which are superior to identical but randomly-orientated polymers. For example, they have higher melting points, greater dielectric strengths, and greater mechanical strength. They may also have many other superior properties as yet undiscovered, for example, in regard to their optical behavior.

In any event, stereo-regular polymers are of great value and therefore methods and apparatus for producing them are of greater importance. Until now, the principal method of producing stereo-regular polymers has been through the use of special catalysts, for example, the Ziegler catalyst used in producing stereo-regular polystrene.

PRIOR ART

M. J. Berry, in a Ph.D. thesis at the University of California at Berkeley in 1970, entitled "Vibrational Energy Distributions Among the Products of Laser Reactions" discloses that chloracetylene reacts with hydrochloric acid which has been excited by a laser to produce predominately the 1,1-isomer of dichlorethylene.

An article by V. S. Letokhov and A. A. Makarov titled "Kinetics of Excitation of Molecular Vibrations by Infrared Laser Radiation" appears in Soviet Physics JETP, Volume 36, No. 6, June 1973.

An article by Stelio Munari, S. Russo, Gianruo Castello, and Corrado Rossi titled "Radiation-Induced Polymerization of Gaseous Ethylene" appears in the Journal of Polymer Science: Part C, No. 16, Part 7, pages 4149 to 4159 (1967).

An article by N. G. Basov, E. P. Markin, A. N. Oraevskii, A. V. Pankratov and A. N. Skachkov titled "Stimulation of Chemical Processes by Infrared Laser Radiation" appears in VEPT Lett. Volume 14, pages 165 to 167 (1971).

An article by B. Cagnac, G. Grynberg, and F. Biraben titled "Spectroscopic D'Absorption Multiphontonique Sans Effect Doppler" in the Journal De Physique, Vol. 34, pages 845 to 858 discloses the beneficial effect on line width which results from placing a mirror on the opposite side of the reaction chamber.

U.S. Pat. No. 3,421,930 discloses the polymerization of a monomer and its condensation in a corona discharge.

U.S. Pat. No. 3,431,137 discloses polymerization in an electric field.

U.S. Pat. No. 3,440,084 discloses the simultaneous electrostatic deposition and electron bombardment polymerization of gaseous alpha-beta unsaturated monomers.

U.S. Pat. No. 3,477,932, discloses a process for the polymerization of acrylamide or acrylates by irradiation of a monomer solution with a laser.

U.S. Pat. No. 3,719,454 discloses apparatus and methods for controlling chemical reactions with a laser.

U.S. Pat. No. 3,405,045 discloses the polymerization of a vinyl acetate in solution using a laser.

SUMMARY OF THE INVENTION

We have discovered that stereo-regular polymers can be produced by generating a moving stream of a gaseous monomer, directing at the monomer a monochromatic light of a wavelength which activates the monomer, and producing an electric field across the activated monomer sufficient to orientate the monomer.

We have also found that when an unsaturated monomer having a bond on a double-bond carbon atom which has a permanent dipole moment is used, stereo-regular polymers can be produced by irradiating the monomer with monochromatic light, the frequency of which resonates with that bond.

DESCRIPTION OF THE INVENTION

The accompanying drawing is a diagrammatic view of a certain presently preferred embodiment of an apparatus according to this invention.

In the drawing, a monomer 1 is forced into chamber 2 under high pressure. Several pinhole baffles 3 in passage 4 permit only a narrow beam 5 of monomer to pass into reaction chamber 6. Monomer which deviates from the beam 5 is returned to chamber 2 through passages 7 by pump 8.

Reaction chamber 6 has a glass side 9 and a mirrored side 10 opposite glass side 9. A laser beam 11 passes through aperture 12 of parabolic mirror 13, strikes concave mirror 14, is reflected back to parabolic mirror 13 thence through glass side 9 through reaction chamber 6, and back through the reaction chamber a second time after being reflected by mirrored side 10.

In the reaction chamber the light beam 11, perpendicular to the motion of monomer beam 5, excites the monomer to a state from which a polymerization reaction can occur. An electric field is generated by an electrode 15 and a second electrode (not shown) parallel to electrode 15, but on the opposite side of monomer beam 5. The electric field is therefore also perpendicular to light beam 11.

Activated monomer is orientated by the electric field and is deposited as a stereo-regular polymer on belt 16. As belt 16 moves around wheels 17 deposited polymer is removed from the reaction zone. The polymer is lifted from the belt as a sheet or thread 18 by scraper 19 and is rolled onto roll 20. Unpolymerized monomer is removed by vacuum through passage 21.

THE MONOMER

The monomers used in this invention are monomers which are gases or which can be volatilized without degradation. Monomers which are gases at room temperature are preferred as they are easier to work with. Also, the monomers must polymerize through a double bond. The monomer must have a dipole moment sufficient to permit the monomer to be orientated in an electric field. While monomers with small dipole moments can be more easily oriented by lowering their temperature or by other device, generally, as a practical matter, monomers having dipole moments of less than about 0.4 cannot be orientated in an electric field of any reasonable strength. For example, a —CH$_3$ bond would not give a sufficient dipole moment. Any monomer which is ionic, of course, would have a sufficient dipole moment.

A special class of monomers are those having a group bonded to a double-bonded carbon atom which has a dipole moment. Monomers of this type are required if the stereo-regularity is to be obtained by activating that particular bond rather than by orientation in an electric field. A general formula for this class of monomer is:

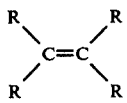

where each R is independently selected from hydrogen, alkyl to C$_6$, aryl, and alkylene (any of which may be linear or branched), subject to the proviso that at least one of the R groups, hereinafter referred to as the "resonating R group," be a group which forms a permanent electric dipole moment with the remainder of the monomer. Monomers having an ionic resonating R group are preferred due to their higher dipole moments. Of that class, particularly preferred are the monomers where the resonating R group is halogen, especially chlorine, as those monomers are economically important. Other suitable resonating R groups include acetate, ether, ester, cyanide, carbazole, pyrrolidone, nitrile, and nitro. Examples of suitable monomers include vinyl chloride, vinyl fluoride, vinyl acetate, N-vinyl carbazole, N-vinyl pyrrolidone, nitro ethylene, vinyl methyl ether, vinyl ethyl ether, 1-chlorobutadiene, acrylonitrile, acrylic acid, and alkylacetate. Mixtures of monomers are also contemplated.

The monomer is most preferably moving in a unidirectional stream at the time of activation, because a rapid forward motion reduces intermolecular collisons and thereby increases the cross-section. That is, if the monomer molecules are moving rapidly in a unidirectional stream there are fewer collisions between the molecules. Such collisions after activation result in a transfer of energy from one molecule to another. The molecules therefore have a variety of energies which means that a variety of products can result instead of a single stereo-regular polymer. Also, a largely forward motion perpendicular to the direction of the radiation reduces the Doppler effect which produces the same undesirable results. Therefore, the forward component $V_f$ of the motion of the molecules should be greater than the lateral component $V_{lat}$ of their motion, and preferably the lateral component is less than one-tenth of the forward component. In quantitative terms, the forward component is preferably greater than 100 m/sec. and the lateral component less than 10 m/sec.

Despite the above considerations, there may be instances where inter-molecular collisions are desirable. Some monomers have a reaction threshold. That is, in order to initiate polymerization, they must be activated to a higher energy state than is necessary to sustain the polymerization once initiated. In such a case, the energy of the light, hν, while suitable for sustaining the polymerization, may not be adequate for initiating it. Therefore, intermolecular collisions may be needed to provide the energy necessary to overcome the reaction threshold.

The temperature of the monomer should be kept within reasonable limits, preferably room temperature, but generally about 10° to about 150° C., since if the temperature is too low the monomer will condense and will not produce stereo-regular polymers. Too high a temperature, of course, will degrade the monomer. Certain temperatures may be more conducive to good results, but these must be found by experiment with the particular monomer being used.

THE LIGHT

The light wavelength is selected to activate the monomer to a state suitable for polymerization. That is, the wavelength must be short enough (and therefore energetic enough) to cause the double bond to open when the monomer molecules collide with each other after activation so that a polymerization is effected.

When the polymerization is to be effected by activation of the resonating bond, the light frequency must resonate with the frequency resulting from that bond. This frequency can be the fundamental frequency or an overtone of the fundamental frequency (hereinafter both are referred to as a "harmonic"). The fundamental frequency is preferred to an overtone frequency because it absorbs resonant radiation most effectively. These frequencies must be determined for each monomer used. This may be accomplished by using absorption spectroscopy to identify the frequency at which the bond absorbs, a technique known in the art. For example, the resonating group (chlorine) in vinyl chloride absorbs at a wavelength of about 720 cm$^{-1}$ and that light wavelength would be used.

The light must be coherent and nearly monochromatic. For the purpose of this invention, laser light is regarded as monochromatic although actually even the most mode-controlled lasers still span a small range of wavelengths. The light is preferably polarized and, if polarized, preferably has its E vector parallel to the electric field as this produces more effective results. The light preferably has an intensity of at least about 3 millijoules/cm$^2$/100 molecular layers.

The light is most preferably perpendicular to the path of the monomer. This is considered to be important because it reduces the influence of the Doppler effect in broadening the absorption line, thereby reducing the cross-section. That is, if the monomer were to move towards or away from the light each monomer molecule would see a higher or lower light frequency, respectively. The effective light frequency would then broaden in bandwidth and would not exactly match the frequency needed for activation or resonance. The result would be a less efficient use of the light and the production of undesirable by-products.

A tuned laser is considered to be the instrument most suited for the practice of this invention, as it permits adjustment of the light frequency for maximum production efficiency.

THE ELECTRIC FIELD

If the light merely activates the monomer, an electric field is required to orientate the monomer until it has polymerized in order to produce stereo-regular polymers. However, if the light is used to activate only the special resonating bond, no electric field is required although it is still preferable to use an electric field for best results.

The electric field should be a DC field, since an AC field will produce non-stereo-regular polymers if the field alternates faster than the molecules move across it, or will produce a mixture of stereo- and nonstereo regular polymers if the molecules move faster than the field alternates because the field will be zero or of ineffective strength much of the time.

The electric field E must be of sufficient strength to overcome the random motions of the molecules. Expressed mathematically, it is preferred that elE be much larger than kT, where e is the electric charge on the dipole, 1 is the distance between the positive and negative charge on the molecule (usually the bond length), k is Boltzmann's constant, and T is the temperature of the molecules. As a practical matter a field of about 10 to about 300 kilovolts per centimeter is considered to be necessary in most instances. Because the electric field required is very large there is a danger that electrical breakdown will occur. This problem is overcome by moving the electrodes close together (preferably about 0.1 to about 0.5 cm apart) and by keeping the speed of the monomer across the electrodes high.

While the electric field can be produced in the conventional way of using two electrodes in an electrical circuit, it is also possible to use the electric field of a polarized light beam. The light beam can be the same light used for activating the monomers or a second light beam can be used.

What is claimed is:

1. An apparatus comprising:
   (A) means for producing a moving stream of gaseous unsaturated monomer having an electric dipole moment;
   (B) a source of laser light which is nearly monochromatic of a wavelength suitable for activating said monomer, directed at said moving stream of monomer;
   (C) means for producing a direct current electric field across monomer activated by said monochromatic light sufficient to orientate said activated monomer; and
   (D) means for collecting said stream after activation and orientation.

2. An apparatus according to claim 1 wherein said electric field is normal to said stream and to said light and said stream is normal to said light.

3. An apparatus according to claim 2 wherein said light is polarized and its E vector is parallel to said electric field.

4. An apparatus according to claim 1 wherein said electric field is about 10 to about 300 Kv/cm and said electrodes are sufficiently close to prevent electrical breakdown.

5. An apparatus according to claim 1 including a mirror opposite said source of monochromatic light positioned to reflect said light back into said stream of gaseous monomer.

6. An apparatus according to claim 1 wherein the forward component of the velocity of the molecules in said stream of monomers is greater than the lateral component of their velocity.

7. An apparatus according to claim 6 wherein said lateral component is less than one-tenth of said forward component.

8. An apparatus according to claim 7 wherein said forward component is greater than 100 m/sec and said lateral component is less than 10 m/sec.

9. An apparatus according to claim 7 wherein said light has an intensity of at least about 3 millijoules/cm$^2$/100 molecular layers.

10. An apparatus according to claim 1 wherein said means for producing said electric field are two parallel electrodes on opposite sides of said stream of monomers.

11. An apparatus comprising
    (A) a reaction zone containing a gaseous monomer of the general formula:

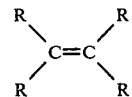

where each R is independently selected from hydrogen, alkyl to C$_6$, aryl, and alkylene, subject to the condition that at least one R, the resonating R group, be a group which forms a permanent electric dipole moment with the remainder of the monomer;
    (B) a source of laser light of a frequency which resonates with a harmonic frequency resulting from the bond of said resonating R group to the remainder of said monomer, directed at said monomer to activate said monomer; and
    (C) means for collecting the reaction product after activation.

12. An apparatus comprising:
    (A) means for producing a moving stream of a gaseous monomer having the general formula:

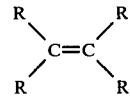

where each R is independently selected from hydrogen, alkyl to C$_6$, aryl, and alkylene, subject to the condition that at least one R, the resonating R group, be a group which forms a permanent electric dipole moment with the remainder of the monomer;
    (B) a source of laser light which is nearly monochromatic of a frequency which resonates with a harmonic frequency resulting from the bond of said resonating R group to the remainder of said monomer, directed at said monomer to activate said monomer; and
    (C) means for producing an electric field across monomer activated by said monochromatic light sufficient to orientate said activated monomer.
    (D) means for collecting said stream after activation and orientation.

* * * * *